United States Patent Office 3,108,091
Patented Oct. 22, 1963

3,108,091
SYNTHETIC POLYAMIDES STABILIZED AGAINST THE ACTION OF LIGHT AND HEAT
Gerhard Illing, Neuleiningen, Pfalz, and Helmut Stahl, Altdorf, near Nurnberg, Germany, assignors to Badische Anilin- & Soda-Fabrik Aktiengesellschaft, Ludwigshafen (Rhine), Germany
No Drawing. Filed Jan. 30, 1961, Ser. No. 85,449
Claims priority, application Germany Feb. 3, 1960
2 Claims. (Cl. 260—45.75)

This invention relates to synthetic polyamides stabilized against the action of light and heat.

In the processing of polyamides, as for example in injection molding machines, screw extruders or hydraulic extruders or during spinning, the same are often exposed to temperatures of about 200° to 340° C. During these operations, as well as when exposed to the action of light and/or air, the polyamides become discolored with simultaneous impairment of their mechanical properties. Discoloration and impairment of the mechanical properties become the more pronounced the higher the temperatures to which the polyamides are exposed.

It is known that the said disadvantages can partly be overcome by the addition of stabilizers, such as carboxylic acid hydrazides, stearates, thiodiphenylamine, hexamethylene-bis-salicylamide, hydroquinone, aminophenol, o-hydroxyphenoxyacetic acid, tricresyl phosphite and other organic phosphorus compounds, lithium hydride, phosphorous acid, hypophosphorous acid or soluble heavy metal polyphosphate complexes. The effect of the known stabilizers is, however, relatively poor, and some of them form colored decomposition or oxidation products. It is also known that polyamides can be processed more satisfactorily if aliphatic carboxylic acids or phosphoric acids are added thereto, but practically no stabilization against the action of light, air and elevated temperatures is achieved by such substances.

It is the object of the present invention to provide polyamides which exhibit considerably improved stability against the action of light, air and heat as compared with polyamides stabilized in known manner.

We have found that polyamides which contain as stabilizers 0.05 to 2% by weight, preferably 0.1 to 0.5% by weight, of hypophosphoric acid ($H_4P_2O_6$) and/or a hypophosphate and 0.001 to 1% by weight, preferably 0.001 to 0.1% by weight, based on the weight of the polyamides, of a water-soluble cerium(III) and/or titanium(III) salt, exhibit particularly good thermal stability and fastness to light. Hypophosphates which may be used according to this invention are those of monovalent to tetravalent metals, for example of alkali metals, such as lithium, potassium and sodium, alkaline earth metals, such as magnesium, calcium and barium, metals of groups IIIA and IIIB of the periodic system of the elements, such as aluminum and cerium, metals of groups IB, IIB, IVA and VIIA, such as copper, zinc, titanium, thorium and manganese, and metals of group VIII, such as iron, nickel and cobalt. All hypophosphates of metals of the said kinds as well as hypophosphoric acid are suitable for the stabilization of polyamides according to the present invention and do not differ very greatly from one another in their stabilizing action. The hypophosphates of potassium, sodium, magnesium, barium and thorium, as for example tetrasodium hypophosphate ($Na_4P_2O_6 \cdot H_2O$), disodium dihydrogen hypophosphate ($Na_2H_2P_2O_6 \cdot 6H_2O$), barium dihydrogen hypophosphate ($BaH_2P_2O_6$) and thorium hypophosphate ($ThP_2O_6$), however, have proved to be especially suitable. Water-soluble salts of trivalent cerium or trivalent titanium that are suitable for the purposes of the present invention are those of which at least about 1% aqueous solutions can be prepared. Halides, such as chlorides, bromides and iodides, as well as sulfonates, formates and acetates of trivalent cerium and trivalent titanium are especially suitable, as for example cerium(III) chloride, cerium(III) acetate, titanium(III) chloride hexahydrate, titanium(III) acetate hexahydrate and titanium(III) sulfate hexahydrate. Either kind of the said substances, i.e. hypophosphates on the one hand and water-soluble cerium(III) or titanium(III) salts on the other hand, may be used alone as stabilizers for polyamides. Surprisingly, however, particularly effective stabilization is achieved when substances of the two kinds are used together.

Polyamides which can be stabilized with advantage with a mixture of the said substances include polycondensation or polyaddition products of caprolactam, caprylic lactam and ω-aminoundecanoic acid as well as of the salts of adipic acid, suberic acid, sebacic acid and undecanoic acid with hexamethylenediamine and decamethylenediamine, of heptadecanedicarboxylic acid and bis-(4-aminocyclohexyl)-methane, of tetramethylene diisocyanate and adipic acid or of aliphatic ω-amino alcohols and dicarboxylic acids each with 4 to 34 carbon atoms between the functional groups.

Such polyamides have, in general, $k$-values of between about 50 and 120, especially between 65 and 90, and can be prepared in the usual manner, for example by the processes described in U.S. patent specifications No. 2,562,797, No. 2,130,523 and No. 2,252,554 and further developments of these processes.

In addition to the stabilizers according to this invention, the polyamides may also contain the usual brightening agents, such as cerium dioxide, titanium dioxide, thorium dioxide or yttrium trioxide ($Y_2O_3$), in amounts of up to about 2% by weight, with reference to the weight of the polyamides. The compatibility of the said stabilizers and conventional brighteners is good.

The stabilizers according to this invention may be added to the polyamides during their production by polycondensation or polyaddition or also during the further processing of the same, as for example in screw extruders, screw-type injection molding machines or kneaders.

Further advantages of the said stabilizers are that they do not form colored decomposition products in the temperature ranges in which the polyamides are processed or used, and that they are not separated from the polyamides during the evaporation of monomeric initial materials under reduced pressure or during the extraction of low molecular weight oligomers by boiling water. It is of particular advantage that the said stabilizers also have a very marked optical brightening effect on the polyamides.

Polyamides stabilized according to this invention are suitable for the production of shaped materials, such as fabrics, injection moldings, cast constructional parts, sheets, films and coatings, which are characterized by special brightness and improved fastness to light and to aging.

The invention will be further illustrated, but is not limited, by the following examples. The parts are by weight, and the $k$-values referred to were determined according to H. Fikentscher, Cellulose Chem. 13, p. 58 (1932).

EXAMPLE 1

1000 parts of hexamethylenediamine adipate are mixed with 3 parts of disodium dihydrogen hypophosphate hexahydrate ($Na_2H_2P_2O_6 \cdot 6H_2O$), 0.01 part of titanium(III) chloride hexahydrate ($TiCl_3 \cdot 6H_2O$), 0.07 part of thorium dioxide and 1000 parts of water. Then polycondensation is effected as usual. The melt is then poured into water, and the polyhexamethylene adipamide is comminuted and dried in conventional manner to a water content of less than 0.1% by weight. The polyhexamethylene adipamide thus obtained has the properties listed in column 2 of the following table. Column 3 specifies the properties of polyhexamethylene adipamide stabilized by adding 3 parts of disodium dihydrogen hypophosphate hexahydrate and 0.01 part of cerium(III) chloride per 1000 parts of hexamethylenediamine adipate and otherwise following the procedure outlined above. By way of comparison, column 4 gives the properties of unstabilized polyhexamethylene adipamide, whereas columns 5 and 6 list the properties of polyhexamethylene adipamide stabilized by adding only 5 parts of sodium phosphite ($Na_2HPO_3$) and 3 parts of disodium dihydrogen pyrophosphate ($Na_2H_2P_2O_7$), respectively, per 1000 parts of hexamethylenediamine adipate and otherwise following the procedure outlined above.

As may be seen from the foregoing table, polycaprolactam stabilized according to the present invention is characterized by extremely good thermal stability. Polycaprolactam of almost equally good thermal stability is obtained by kneading the same amounts of the said stabilizers into the material in a disk kneader.

EXAMPLE 3

100 parts of polycaprylic lactam ($k$-value in concentrated sulfuric acid: 76.4) are thoroughly mixed with 0.2 part of tetrasodium hypophosphate ($Na_4P_2O_6$), 0.7 part of a 1% aqueous titanium(III) acetate solution and 1 part of titanium dioxide. The resultant mixture is

*Table 1*

POLYHEXAMETHYLENE ADIPAMIDE

| 1 | 2 | 3 | 4 | 5 | 6 | 7 |
|---|---|---|---|---|---|---|
| Properties | Stabilized with $Na_2H_2P_2O_6.6H_2O$ and $TiCl_3.6H_2O$ | Stabilized with $Na_2H_2P_2O_6.6H_2O$ and $CeCl_3$ | Unstabilized | Stabilized with $Na_2HPO_3$ | Stabilized with $Na_2H_2P_2O_7$ | Testing specifications |
| Density | 1.14 g./cm.$^3$ | 1.14 g./cm.$^3$ | 1.13 g./cm.$^3$ | 1.12 g./cm.$^3$ | 1.12 g./cm.$^3$ | DIN 53, 479. |
| k-Value | 73.4 | 73.4 | 72.3 | 72.9 | 72.5 | In conc. $H_2SO_4$ at 25° C. |
| Melting range | 260-263° C | 260-263° C | 260-265° C | 260-263° C | 260-263° C | "Kofler-Bank." |
| Tensile strength | 850 kg./cm.$^2$=100% | 100% | 100% | 100% | 100% | DIN 53, 371. |
| Color | White | White | White | White | White |  |
| Degree of remission | 67% | 62% | 60% | 62% | 57% | Referred to MgO=100%; measured with electrical remission photometer. |
| After storing in the air for 3 months at 110° C: |  |  |  |  |  |  |
| Tensile strength | 90-95% | 90-95% | 60-70% | 55-60% | 45% |  |
| Color | Yellowish | Yellowish | Black-brown | Yellowish | Yellowish |  |
| Degree of remission | 45-50% | 40-48% | 5-10% | 35-40% | 15-20% |  |

The foregoing table above all shows the supreme thermal stability of polyhexamethylene adipamide stabilized according to the present invention. Almost equally well stabilized polyhexamethylene adipamide is obtained by kneading the same amounts of the said stabilizers into the material in an extruder.

EXAMPLE 2

1000 parts of caprolactam are mixed with 1000 parts of water, 3 parts of thorium hypophosphate ($ThP_2O_6$) and 0.01 part of titanium(III) chloride hexahydrate. Then polycondensation is effected in the manner usual for caprolactam. Nitrogen is used to force the polycaprolactam into hot water, and the low molecular weight constituents contained in the polyamide are extracted with boiling water in the course of 24 hours. The polyamide is then ground and dried in conventional manner to a water content of less than 0.1% by weight. The properties of the stabilized polycaprolactam thus obtained are shown in column 2 of the following table. Column 3 lists the properties of polycaprolactam stabilized in the same manner with 5 parts of disodium dihydrogen hypophosphate hexahydrate and 0.01 part of titanium trichloride hexahydrate per 1000 parts of caprolactam. By way of comparison, column 4 gives the properties of unstabilized polycaprolactam.

thoroughly kneaded in a double-shaft disk kneader at 240° to 260° C. The properties of the polycaprylic lactam stabilized and pigmented in this manner are shown in column 2 of the following table. By way of comparison, column 3 gives the properties of unstabilized polycaprylic lactam to which 1 part of titanium dioxide only was added as a brightener and that was thoroughly kneaded under the same conditons. The properties listed in the following table were determined according to the testing specifications given in Examples 1 and 2.

*Table 3*

| 1 | 2 | 3 |
|---|---|---|
| Properties | Stabilized | Unstabilized |
| Density | 1.12 g./cm.$^3$ | 1.13 g./cm.$^3$. |
| Monomer and oligomer level | 0.07% | 0.09%. |
| k-Value | 77.2 | 75.8. |
| Melting range | 193-197° C | 190-195° C. |
| Tensile strength | 860 kg./cm.$^2$ | 840 kg./cm.$^2$. |
| Color | White | White. |
| Degree of remission | 78% | 73%. |
| After storing in the air for 6 months at 110° C.: |  |  |
| Tensile strength | 810 kg./cm.$^2$ | 340 kg./cm.$^2$. |
| Color | White | Ivory. |
| Degree of remission | 60-65% | 48-53%. |

*Table 2*

POLYCAPROLACTAM

| 1 | 2 | 3 | 4 | 5 |
|---|---|---|---|---|
| Properties | Stabilized with $ThP_2O_6$ and $TiCl_3.6H_2O$ | Stabilized with $Na_2H_2P_2O_6.6H_2O$ and $TiCl_3.6H_2O$ | Unstabilized | Testing specifications |
| Density | 1.15 g./cm.$^3$ | 1.14 g./cm.$^3$ | 1.13 g./cm.$^3$ | DIN 53,479. |
| Monomer and oligomer level | 0.32% | 0.34% | 0.17% | Determined by extraction with methanol. |
| k-Value | 74.4 | 73.8 | 72.9 | In conc. $H_2SO_4$ at 25° C. |
| Melting range | 212-216° C | 212-216° C | 215-217° C | "Kofler-Bank." |
| Tensile strength | 800 kg./cm.$^2$=100% | 100% | 100% | DIN 53,371. |
| Color | White | White | White |  |
| Degree of remission | 71% | 70% | 69% | MgO=100%. |
| After storing in the air for 6 months at 110° C.: |  |  |  |  |
| Tensile strength | 85-90% | 90-95% | 30-40% |  |
| Color | Yellowish | Yellowish | Brown |  |
| Degree of remission | 45-55% | 48-56% | 20-25% |  |

We claim:
1. Synthetic polyamides containing as stabilizers 0.05 to 2% by weight of a phosphorous compound selected from the group consisting of thorium hypophosphate and alkali metal hypophosphate and 0.001 to 1% by weight of a water-soluble metal salt selected from the group consisting of cerium(III) salts and titanium(III) salts, said percentages being based on the weight of the polyamides.

2. Synthetic polyamides containing as stabilizers 0.1 to 0.5% by weight of a phosphorus compound selected from the group consisting of thorium hypophosphate and alkali metal hypophosphate and 0.001 to 0.1% by weight of a water-soluble metal salt selected from the group consisting of halides, sulfates, formates, and acetates of trivalent cerium and trivalent titanium, said percentages being based on the weight of the polyamides.

References Cited in the file of this patent

UNITED STATES PATENTS

| | | |
|---|---|---|
| 2,224,695 | Prutton | Dec. 10, 1940 |
| 2,905,555 | Fuchsman et al. | Sept. 22, 1959 |

FOREIGN PATENTS

| | | |
|---|---|---|
| 767,897 | Great Britain | Feb. 6, 1957 |

OTHER REFERENCES

Ephraim: Inorganic Chemistry, 5th Ed. by Thorne et al., Interscience Publishers, N.Y., 1949, pp. 728–30.